J. H. WELDON.
CHICKEN ROOST.
APPLICATION FILED JUNE 19, 1916.
1,232,136.
Patented July 3, 1917.
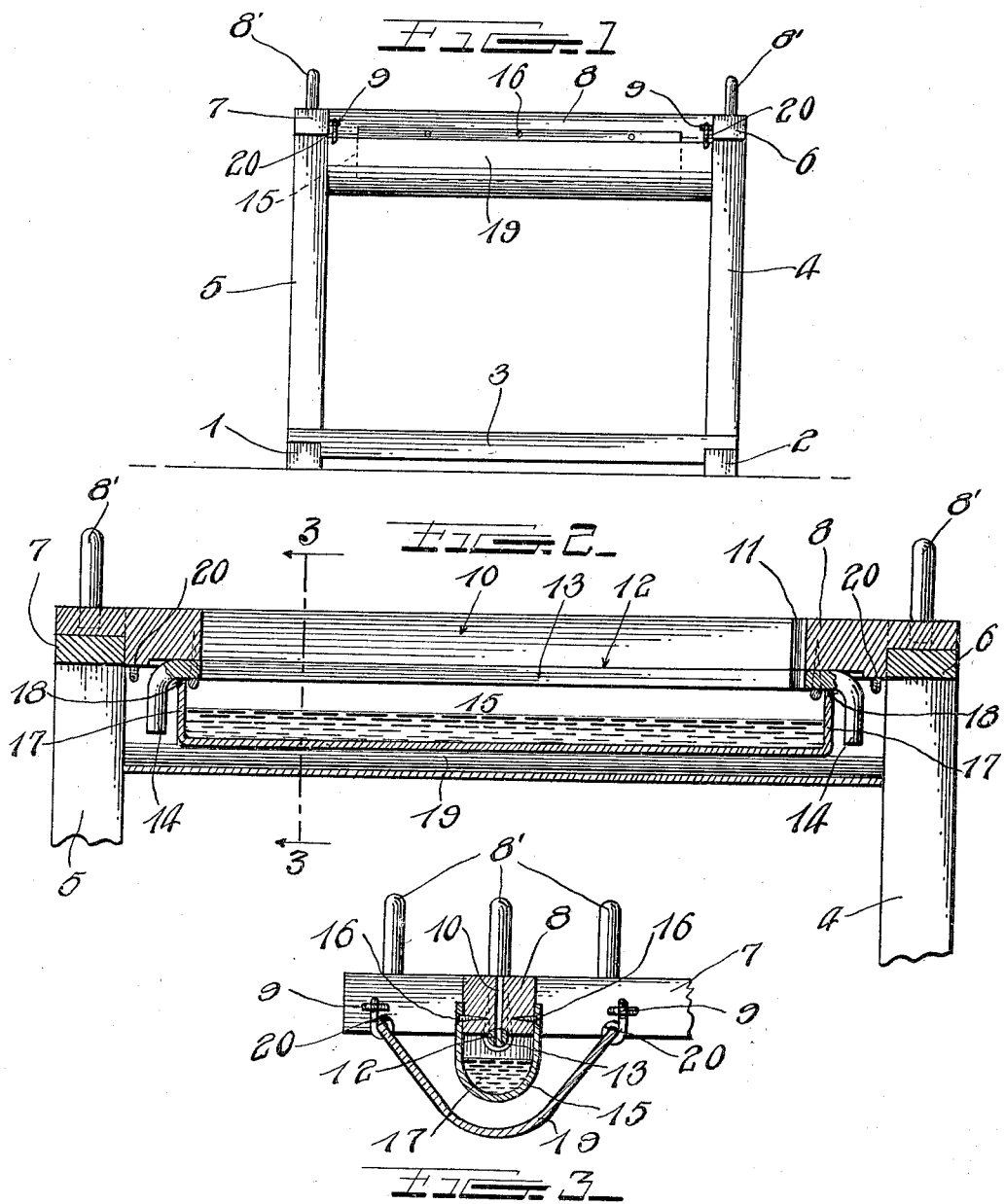
Witness
George W. Giovanpetti
Inventor
J. H. Weldon
By H. B. Willson & Co.
Attorneys

UNITED STATES PATENT OFFICE.

JOHN H. WELDON, OF COMANCHE, OKLAHOMA.

CHICKEN-ROOST.

1,232,136.

Specification of Letters Patent.

Patented July 3, 1917.

Application filed June 19, 1916. Serial No. 104,565.

*To all whom it may concern:*

Be it known that I, JOHN H. WELDON, a citizen of the United States, residing at Comanche, in the county of Stephens and State of Oklahoma, have invented certain new and useful Improvements in Chicken-Roosts; and I do declare the following to be a full, clear, and exact description of the invention, such as will enable others skilled in the art to which it appertains to make and use the same.

This invention relates to new and useful improvements in poultry roosts for fowls of various kinds, and the primary object of the invention is to provide a fumigator which may be used with the roost, and which will keep the same practically vermin proof, and will also keep the fowls roosting thereon in a like condition.

Another object of this invention is to provide a poultry roost of this character, that is provided with a suitable supporting means, and also with a fecal receptacle disposed beneath the roost and suspended from the support.

Another object of this invention provides a device of this character which is easily and simply constructed, inexpensive to manufacture, and one which will be very efficient in operation.

With these and numerous other objects in view my invention consists of the novel features of construction, combination, and arrangement of parts which will be hereinafter referred to and more particularly pointed out in the specification and claim.

Referring to the drawings:

Figure 1 is an end elevation of the roost;

Fig. 2 is a central vertical longitudinal section through one of the perches; and Fig. 3 is a transverse section taken on the line 3—3 of Fig. 2.

In describing my invention, I shall refer to the drawings in which similar reference characters designate corresponding parts throughout the several views and in which in Fig. 1, I have illustrated my improved poultry roost, which comprises a supporting means for perches upon which the fowls rest, and said perches are provided with fumigating means, and also have disposed beneath them fecal receptacles, that will make roosts of this character absolutely clean and sanitary, as well as vermin proof.

The supporting means of my improved poultry roost comprises a pair of parallel base bars 1 and 2, which are adapted to be positioned upon the ground, or floor of the poultry house, and which are provided intermediate at their ends with a suitable cross bar 3. Projecting upwardly from the base bars 1 and 2 at a point intermediate their ends of the same are a pair of upright standards 4 and 5, which have positioned on their upper ends horizontally extending parallel arms 6 and 7, which are disposed in a single plane with the base bars 1 and 2, and which are secured to the ends of the standards at a point intermediate their ends. Extending transversely across the arms 6 and 7, at points adjacent the opposite ends of the same are perches 8, upon which the fowls roost.

The different parts, namely, the bars and standards, arms and perches of this device are connected together by having their ends notched, and positioned in each other as clearly illustrated in the drawings. The upper surface of the arms 6 and 7 are provided with a plurality of spaced upright studs 8' thereon, which are so positioned to prevent the fowls from roosting on the arms and not on the perches. The inner surfaces of the arms 6 and 7 adjacent opposite sides of the perches 8 are provided with eyes 9 for a purpose to be hereinafter more fully described.

The perches 8 employed in this type of poultry roost, are provided with longitudinally extending slots 10 therein, that extend substantially from a point adjacent one of their ends one to the other, and one end of said slot is enlarged as shown at 11. These slots 10 extend vertically through the perches from the top to the bottom of the same, and secured to the bottom of the perches are longitudinally extending rods 12 which are disposed preferably in a groove former at the outlet of the slots 10, and the said rods 12 have extending downwardly therethrough a longitudinally extending slot 13, which is adapted when the rod is turned in a certain position to aline with the slot 10 through the perch. These rods 12 are rotatably mounted on the bottom of the perch, and the outer ends 14 of the same bent so as to form handles whereby the rods may be rotated to either move the slot 13 in the rods into or out of alinement with the slots 10 in the perches. By this means a cut-off valve is formed for a purpose to be hereinafter more fully described. Secured to the perches 8, in such a manner that they will be suspended beneath the same are substantially U-shaped fumigator containing receptacles 15, which have their opposite edges secured to the side edges of the perches as shown at 16 and having upturned ends 17, that are positioned adjacent the opposite ends of the perches substantially between the arms 6 and 7 of the support. The ends 17 of the receptacle 15 are provided with openings 18 therein, through which the opposite ends of the rods project, so that the bent extremities 14 of said rods will be positioned outside of the receptacle, whereby the cut-off valve may be regulated.

The receptacle 15 is adapted to receive crude oil, kerosene, or any other fumigating liquid or composition. The fumigating liquid or composition is poured into the receptacle through the enlarged end 11 of the slot 10 through the perch. When the liquid is in the receptacle and the cut-off valve is opened the slot therethrough is disposed in alinement with the slot in the perch, the liquid will evaporate and pass up through the slot in the perch and onto the fowls that are roosting thereon. By this means the vermin on the fowls will be exterminated, and the perches will also be kept vermin proof. The portion of the rod 12 that is disposed beneath the enlarged end 11 of the slot 10, is likewise enlarged, so that when the rod is moved to closed position, the slots 10 will be entirely closed, and the fumigating liquid will be prevented from escaping from the receptacle.

This device is also provided with fecal receiving pans or receptacles that are adapted to be suspended beneath the perches 8, and between the arms 6 and 7 of the support. These pans are substantially U-shaped in cross section, and are designated by the numeral 19. They are substantially of equal length to the space between the arms 6 and 7 and when in position the opposite ends of the same are disposed a predetermined distance from the opposite sides of the perches 8, while the body of the receptacles would be suspended beneath said perches.

The receptacles 19 will be held in this position by means of hooks 20 which are secured to the corners of the same, and said hooks are adapted to be positioned within the eyes 9 that are positioned on the inner surfaces of the arms 6 and 7 adjacent the sides of the perches 8. By this means the fecal receptacles may be easily secured in position, and removed when desired to clean the same.

From the foregoing description, the construction and operation of this device will be obvious and that I provide a simple and efficient means for carrying out the objects of the invention. The perches used in this roost will be absolutely vermin proof, and will also exterminate vermin from the fowls that roost thereon, owing to the fact that the fumigating material contained in the receptacle that holds the same directly beneath the perches, will evaporate and consequently exterminate the vermin from the fowls roosting on the perches. The perches are also provided with removable receptacles disposed beneath the same and the fumigating receptacle, that form fecal receivers, and which are adapted to be easily removed and cleaned when necessary. The fowls will be prevented from roosting on any parts of this device except the designated perches owing to the upwardly projecting studs on the outer surfaces of the arms 6 and 7.

I claim:—

A device of the class described comprising a flat-sided perch having a longitudinally extending vertical slot therethrough, a substantially U-shaped fumigating receptacle disposed beneath said perch with the upper portions of its opposite sides engaged with and detachably secured to the opposite sides of the perch, said receptacle having closed ends, the flat bottom side of said perch having a longitudinally extending groove therein terminating in the slot and extending beyond the opposite ends of the receptacle, a longitudinally extending rod positioned in said groove, bearings for said rod, means to rotate said rod outside of the receptacle, and said rod having a longitudinally extending slot therethrough adapted to be moved in and out of alinement with the slot in the perch upon rotation of the rod.

In testimony whereof I have hereunto set my hand in the presence of two subscribing witnesses.

JOHN H. WELDON.

Witnesses:
G. A. KINCAID,
RALPH KOBEL.

Copies of this patent may be obtained for five cents each, by addressing the "Commissioner of Patents, Washington, D. C."